(12) United States Patent
Jaksztat et al.

(10) Patent No.: US 8,574,486 B2
(45) Date of Patent: Nov. 5, 2013

(54) METHOD AND DEVICE FOR BLOW MOLDING CONTAINERS

(75) Inventors: Wolf Jaksztat, Hamburg (DE); Michael Linke, Ahrensburg (DE); Rolf Baumgarte, Hamburg (DE); Michael Litzenberg, Geesthacht (DE); Klaus Vogel, Barsbüttel (DE); Günther Godau, Hamburg (DE)

(73) Assignee: KHS Corpoplast GmbH, Hamburg (DE)

( * ) Notice: Subject to any disclaimer, the term of this patent is extended or adjusted under 35 U.S.C. 154(b) by 1266 days.

(21) Appl. No.: 10/570,796

(22) PCT Filed: Aug. 30, 2004

(86) PCT No.: PCT/DE2004/001916
§ 371 (c)(1),
(2), (4) Date: Nov. 16, 2006

(87) PCT Pub. No.: WO2005/023520
PCT Pub. Date: Mar. 17, 2005

(65) Prior Publication Data
US 2007/0164488 A1    Jul. 19, 2007

(30) Foreign Application Priority Data

Sep. 5, 2003 (DE) .................................. 103 40 915
Jan. 26, 2004 (DE) .......................... 10 2004 003 939

(51) Int. Cl.
*B29C 49/12* (2006.01)
(52) U.S. Cl.
USPC ............ 264/532; 264/529; 425/529; 425/535

(58) Field of Classification Search
None
See application file for complete search history.

(56) References Cited

U.S. PATENT DOCUMENTS 4,304,542 A * 12/1981 Sauer ........................... 425/523
5,182,122 A    1/1993 Uehara et al.
5,200,134 A    4/1993 Collombin et al.

FOREIGN PATENT DOCUMENTS

| DE | 28 56 132 | 7/1979 |
| DE | 44 05 743 | 1/1998 |
| DE | 199 34 320 | 1/2001 |
| DE | 101 50 085 | 4/2003 |

OTHER PUBLICATIONS

Patent Abstracts of Japan, BD. 2000, No. 21, Aug. 3, 2001 & JP 2001 088202 A (Hokkai Can Co Ltd), Apr. 3, 2001.
Patent Abstracts of Japan, BD. 2000, No. 15, Apr. 6, 2001 & JP 2000 343590 A (Toyo Seikan Kaisha Ltd), Dec. 12, 2000.
Patent Abstracts of Japan, JP 61146521 A (Toyo Seikan Kaisha Ltd), Jul. 4, 1986.

* cited by examiner

*Primary Examiner* — Monica Huson
(74) *Attorney, Agent, or Firm* — Lucas & Mercanti, LLP; Klaus P. Stoffel

(57) ABSTRACT

Disclosed are a method and a device for blow molding containers (2). A parison (1) is stretched by means of a stretching rod (11) within a blow mold (4) and molded into the container by applying blow pressure following thermal conditioning. The pressurized gas is introduced into the container (2) via at least two different flow paths (55, 56). Advantageously, one of the flow paths (56) ends near the orifice area (21) while a second flow path (55) ends near a container bottom (51). At least some of the pressurized gas is introduced into the container (2) through the stretching rod (11).

18 Claims, 10 Drawing Sheets

METHOD AND DEVICE FOR BLOW MOLDING CONTAINERS

The invention concerns a method for blow molding containers, in which a preform is stretched inside a blow mold by a stretch rod after thermal conditioning and is reshaped into the container by the action of blowing pressure, and in which pressurized gas is fed into the container through the stretch rod.

The invention also concerns a device for blow molding containers, which has at least one blowing station with a blow mold and at least one stretch rod, and in which the stretch rod is connected to a supply system for supplying pressurized gas.

In container molding by the action of blowing pressure, preforms made of thermoplastic material, for example, preforms made of PET (polyethylene terephthalate), are fed to different processing stations within a blow-molding machine. Typically, a blow-molding machine of this type has a heating system and a blowing system, in which the preform, which has first been brought to a desired temperature, is expanded by biaxial orientation to form a container. The expansion is effected by means of compressed air, which is fed into the preform to be expanded. DE-OS 43 40 291 explains the process-engineering sequence in this type of expansion of the preform. The aforementioned introduction of the pressurized gas comprises both the introduction of compressed gas into the developing container bubble and the introduction of compressed gas into the preform at the beginning of the blowing process.

The basic structure of a blowing station for container molding is described in DE-OS 42 12 583. Possible means of bringing the preform to the desired temperature are explained in DE-OS 23 52 926.

Various handling devices can be used to convey the preforms and the blow-molded containers within the blow-molding device. The use of transport mandrels, onto which the preforms are slipped, has proven especially effective. However, the preforms can also be handled with other supporting devices. Other available designs are gripping tongs for handling the preforms and expanding mandrels, which can be inserted in the mouth region of the preform to support the preform.

The handling of containers with the use of transfer wheels is described, for example, in DE-OS 199 06 438 with the transfer wheel arranged between a blowing wheel and a delivery line.

The above-explained handling of the preform occurs, for one thing, in so-called two-step processes, in which the preforms are first produced by injection molding and temporarily stored and then later conditioned with respect to their temperature and blown into containers. For another, the preforms need to be handled in so-called one-step processes, in which the preforms are first produced by injection molding and allowed to solidify sufficiently and are then immediately suitably conditioned with respect to their temperature and then blow molded.

With respect to the blowing stations that are used, various embodiments are known. In the case of blowing stations that are arranged on rotating transport wheels, book-like opening of the mold supports is often encountered. However, it is also possible to use mold supports that can be moved relative to each other or that are guided in a different way. In stationary blowing stations, which are suitable especially for accommodating several cavities for container molding, plates arranged parallel to one another are typically used as mold supports.

DE-OS 101 45 579 gives a detailed description of a stretching system of a blowing station with an associated stretch rod. The stretch rod is designed here as a solid rod, and the blowing air is fed to the blow mold by a connecting piston that has a larger inside diameter than the outside diameter of the stretch rod. This produces an annular gap between the stretch rod and an inner surface of the connecting piston, through which the pressurized gas can flow.

The use of a hollow stretch rod is described, for example, in DE-OS 28 14 952. A connection for the pressurized gas is created in this case by an end of the tubularly shaped stretch rod that faces away from a stretch rod tip. Supplying pressurized gas through the end of a hollow stretch rod is also described in DE-OS 34 08 740 C2.

The previously known pressurized gas supply systems have not yet been able to meet all of the requirements that are being placed on them by continually increasing production rates. In accordance with the prior art, pressurized gas has been supplied until now in such a way that either the entire amount of pressurized gas required for the expansion of the preform is supplied through an annular gap that surrounds the stretch rod or, when hollow stretch rods are used, through the stretch rod.

The objective of the present invention is to specify a method of the type described at the beginning, by which the process time for molding the containers is reduced.

In accordance with the invention, this objective is achieved by feeding the pressurized gas into the container by at least two different flow paths.

A further objective of the invention is to design a device of the aforementioned type in such a way that increased productivity can be achieved per blowing station used.

In accordance with the invention, this objective is achieved by providing the blowing station with at least two different pressurized gas flow paths that lead into the space surrounded by the blow mold.

By using two different flow paths for the pressurized gas used for blow molding the preform into the container, it is possible to achieve optimized process conditions with respect to the reshaping of the thermoplastic material. The compressed air flowing into the container not only causes expansion of the preform, but also cools the container material at the same time by virtue of the fact that the compressed gas flows past the material of the preform and the developing container bubble.

Cooling of the container material is desired in those regions where the preform has already at least approximately taken on the final shape of the container. However, cooling of the container material is undesirable in those regions in which relatively strong deformation of the material is still necessary. Due to the separate flow paths leading into the blow mold, it is possible to control the flow of pressurized gas into the container in such a way that the cooling of the container material achieved by the flow of pressurized gas into the container is optimized with respect to time, while at the same time a short filling time is achieved.

The inflow of pressurized gas can have a cooling effect that is locally optimized and optimized with respect to time if the pressurized gas is conveyed at least temporarily by only one of the flow paths.

Taking into account the geometry of a developing container bubble, it has been found to be advantageous to introduce the pressurized gas into the preform in the vicinity of the mouth section in a first phase of the process.

A low flow resistance during a preblowing phase is achieved by introducing the pressurized gas during the first phase of the process by a flow path that surrounds the stretch rod.

A locally precisely defined pressurized gas supply is also assisted by conveying the pressurized gas through the stretch rod in a second phase of the process.

Taking into account the distribution of material that occurs during the blow molding, it has been found to be advantageous to introduce the pressurized gas in the vicinity of the base of the container during the second phase of the process.

The process can be further optimized by introducing the pressurized gas at a higher pressure during the second phase of the process than during the first phase of the process.

A very quick pressure reduction after a container has been molded is achieved by relieving the pressure after first retracting the stretch rod.

Another variant for assisting the cooling effect consists in relieving the pressure at least partially through the stretch rod.

Increased mechanical stability of the stretch rod by enlargement of the rod diameter can be achieved if at least two flow paths run through the stretch rod.

A first flow path can be provided by a flow path that opens into the blow mold in the vicinity of an access opening of the blow mold.

Additional possibilities of process optimization with respect to time are provided if one flow path opens at least temporarily into an interior space enclosed by the blow mold in the vicinity of a base section of the blow mold.

A typical embodiment consists in the fact that the first flow path is designed for feeding pressurized gas for molding the container.

In another typical embodiment proposed in accordance with the invention, the second flow path is designed for feeding pressurized gas for molding the container.

In particular, it is found to be advantageous for at least two flow paths to be designed for feeding pressurized gas with different pressure levels.

A wear-resistant connection of the interior of the stretch rod to the supply channels that have been provided can be accomplished if the stretch rod has an interior that is enclosed by sidewalls, and if the interior is connected to a pressurized gas supply by a plurality of recesses in the wall.

Controlled presetting of the given flow paths and flow times can be accomplished by arranging at least one adjusting element for realizing a valve function in the area of each flow path.

Specific embodiments of the invention are schematically illustrated in the drawings.

Figure 1:
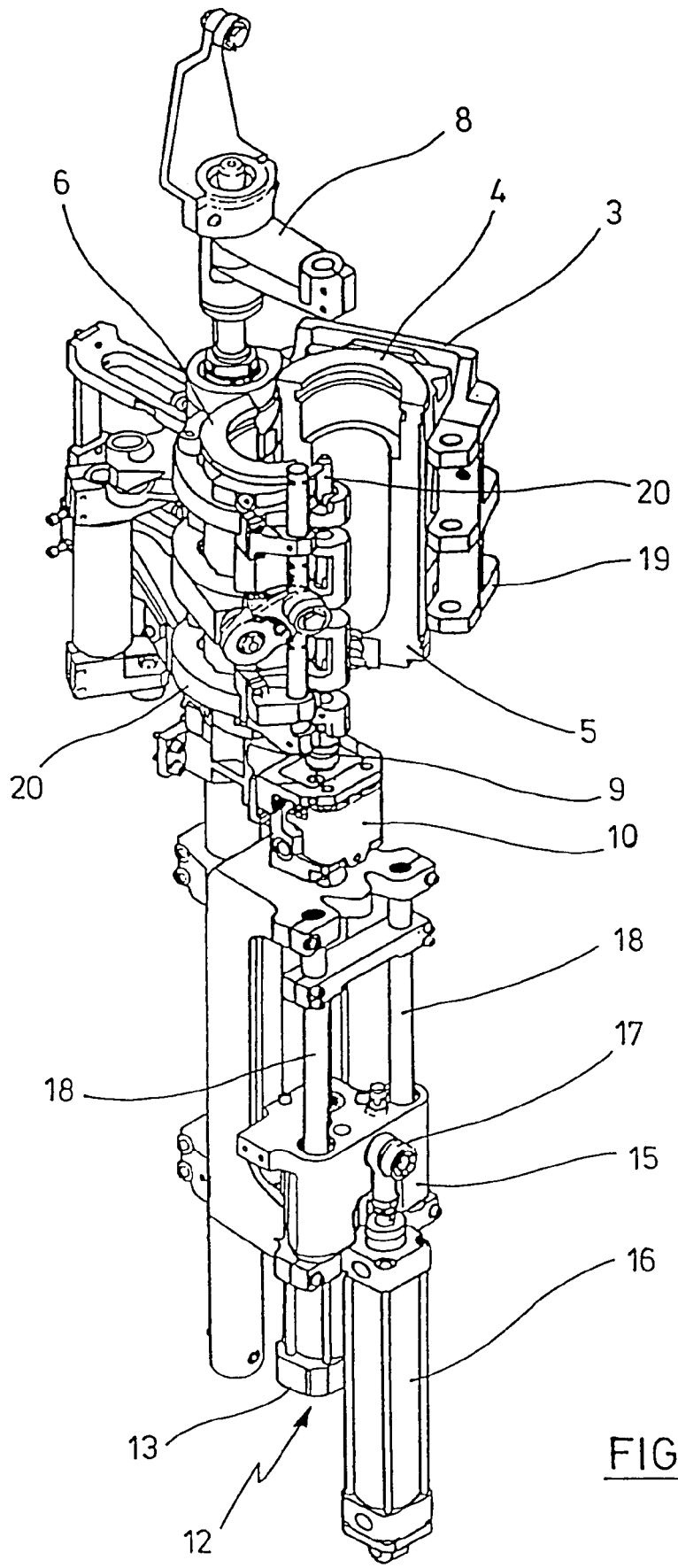
FIG. 1 shows a perspective view of a blowing station for producing containers from preforms.
Figure 2:
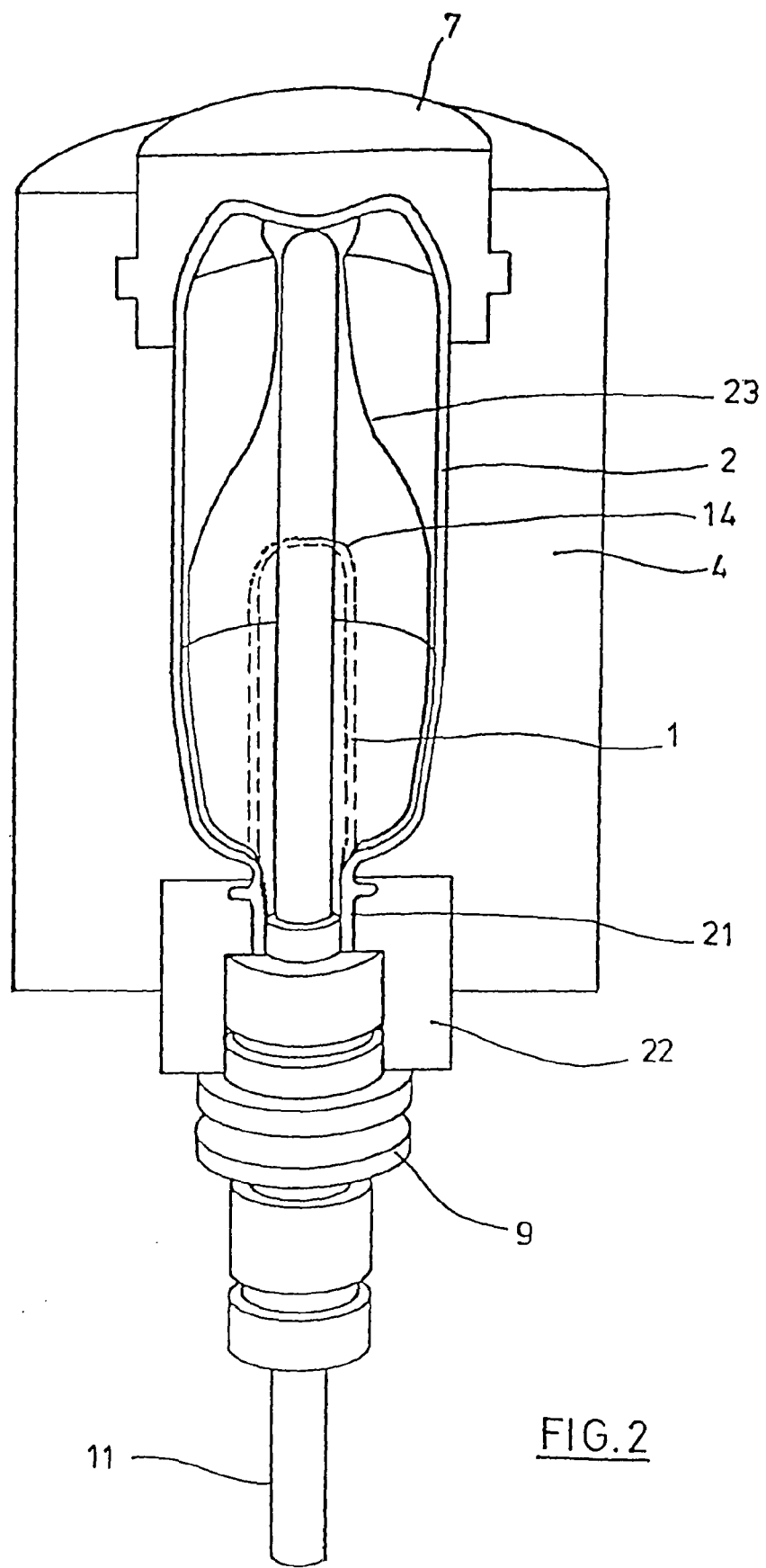
FIG. 2 shows a longitudinal section through a blow mold, in which a preform is stretched and expanded.

FIGS. 1 and 2 show the basic design of a device for reshaping preforms 1 into containers 2.

The device for molding the container 2 consists essentially of a blowing station 3, which is provided with a blow mold 4, into which a preform 1 can be inserted. The preform 1 can be an injection-molded part made of polyethylene terephthalate. To allow a preform 1 to be inserted into the blow mold 4 and to allow the finished container 2 to be removed, the blow mold 4 consists of mold halves 5, 6 and a base part 7, which can be positioned by a lifting device 8. The preform 1 can be held in the area of the blowing station 3 by a transport mandrel 9, which, together with the preform 1, passes through a large number of treatment stations. However, it is also possible to insert the preform 1 directly into the blow mold 4 with tongs or other handling devices.

To allow compressed air to be fed in, a connecting piston 10 is arranged below the transport mandrel 9. It supplies compressed air to the preform 1 and at the same time produces a seal relative to the transport mandrel 9. However, in a modified design, it is also basically possible to use stationary compressed air feed lines.

In this embodiment, the preform 1 is stretched by means of a stretch rod 11, which is positioned by a cylinder 12. In accordance with another embodiment, the stretch rod 11 is mechanically positioned by cam segments, which are acted upon by pickup rollers. The use of cam segments is advantageous especially when a large number of blowing stations 3 is arranged on a rotating blowing wheel.

In the embodiment illustrated in FIG. 1, the stretching system is designed in such a way that a tandem arrangement of two cylinders 12 is provided. Before the start of the actual stretching operation, the stretching rod 11 is first moved into the area of a base 14 of the preform 1 by a primary cylinder 13. During the stretching operation itself, the primary cylinder 13 with the stretch rod extended, together with a carriage 15 that carries the primary cylinder 13, is positioned by a secondary cylinder 16 or by means of cam control. In particular, it is proposed that the secondary cylinder 16 be used in such a way under cam control that a current stretching position is predetermined by a guide roller 17, which slides along a curved track while the stretching operation is being carried out. The guide roller 17 is pressed against the guide track by the secondary cylinder 16. The carriage 15 slides along two guide elements 18.

After the mold halves 5, 6, which are arranged in the area of supports 19, 20, are closed, the supports 19, 20 are locked relative to each other by means of a locking device 20.

To adapt to different shapes of a mouth section 21 of the preform 1, provision is made for the use of separate threaded inserts 22 in the area of the blow mold 4, as shown in FIG. 2.

In addition to the blow-molded container 2, FIG. 2 shows the preform 1, which is drawn with broken lines, and also shows schematically a container bubble 23 in the process of development.

Figure 3:
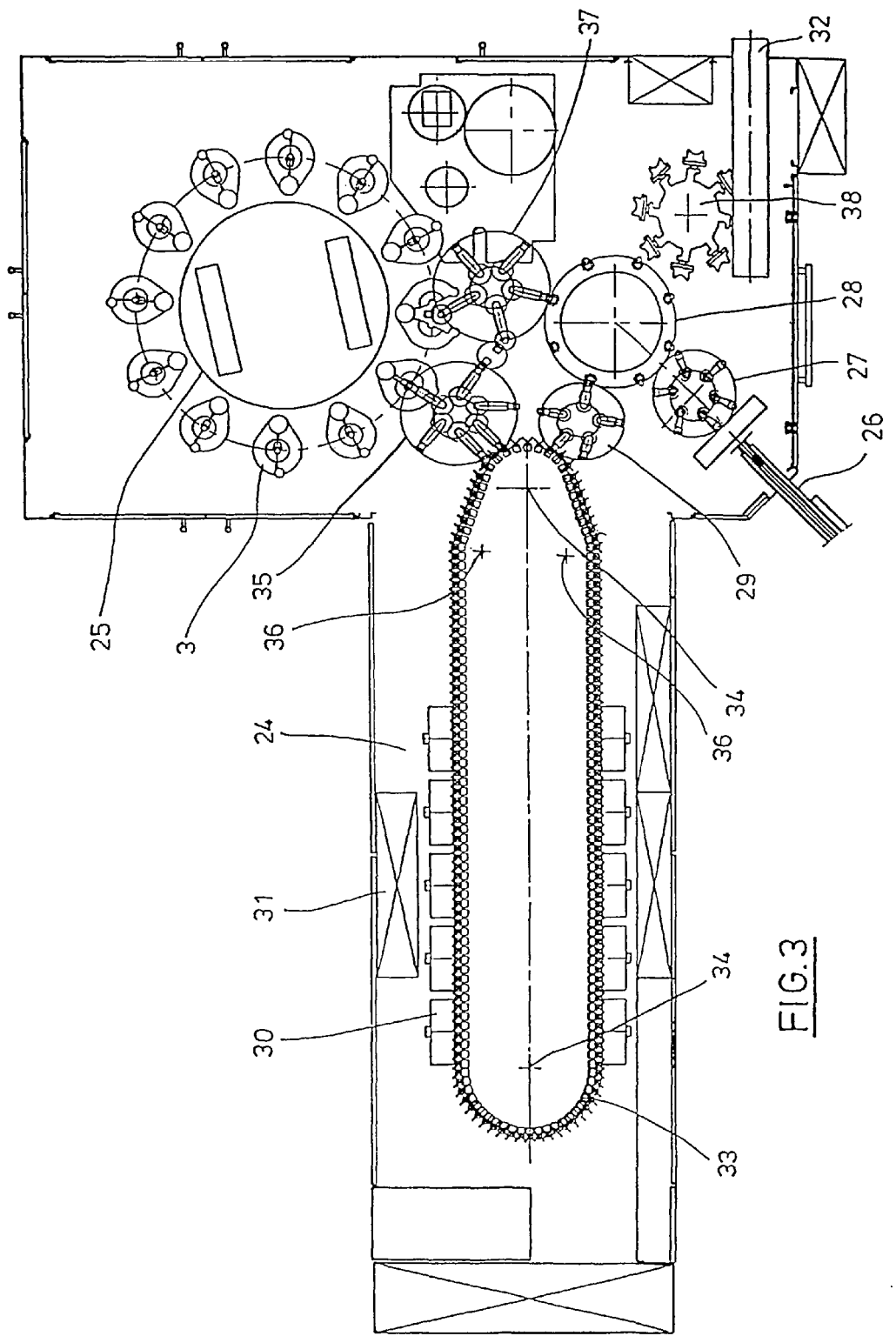
FIG. 3 shows a drawing that illustrates a basic design of a device for blow molding containers.

FIG. 3 shows the basic design of a blow-molding machine, which has a heating line 24 and a rotating blowing wheel 25. Starting from a preform feeding device 26, the preforms 1 are conveyed to the area of the heating line 24 by transfer wheels 27, 28, 29. Radiant heaters 30 and fans 31 are arranged along the heating line 24 to bring the preforms 1 to the desired temperature. After sufficient heat treatment of the preforms 1, they are transferred to the blowing wheel 25, where the blowing stations 3 are located. The finished blow-molded containers 2 are fed to a delivery line 32 by additional transfer wheels.

To make it possible for a preform 1 to be reshaped into a container 2 in such a way that the container 2 has material properties that ensure a long shelf life of the foods, especially beverages, with which the container 2 is to be filled, specific process steps must be followed during the heating and orientation of the preforms 1. In addition, advantageous effects can be realized by following specific dimensioning specifications.

Various plastics can be used as the thermoplastic material. For example, PET, PEN, or PP can be used.

The preform 1 is expanded during the orientation process by feeding compressed air into it. The operation of supplying compressed air is divided into a preblowing phase, in which gas, for example, compressed air, is supplied at a low pressure level, and a subsequent main blowing phase, in which gas is supplied at a higher pressure level. During the preblowing phase, compressed air with a pressure in the range of 10-25 bars is typically used, and during the main blowing phase, compressed air with a pressure in the range of 25-40 bars is supplied.

FIG. 3 also shows that in the illustrated embodiment, the heating line 24 consists of a large number of revolving transport elements 33, which are strung together like a chain and are moved along by guide wheels 34. In particular, it is proposed that an essentially rectangular basic contour be set up by the chain-like arrangement. In the illustrated embodiment, a single, relatively large-sized guide wheel 34 is used in the area of the expansion of the heating line 24 facing the transfer wheel 29 and a feed wheel 35, and two relatively small-sized guide wheels 36 are used in the area of adjacent deflections. In principle, however, any other type of guides are also conceivable.

To allow the closest possible arrangement of the transfer wheel 29 and the feed wheel 35 relative to each other, the illustrated arrangement is found to be especially effective, since three guide wheels 34, 36 are positioned in the area of the corresponding expansion of the heating line 24, namely, the smaller guide wheels 36 in the area of the transition to the linear stretches of the heating line 24 and the larger guide wheel 34 in the immediate area of transfer to the transfer wheel 29 and transfer to the feed wheel 35. As an alternative to the use of chain-like transport elements 33, it is also possible, for example, to use a rotating heating wheel.

After the blow molding of the containers 2 has been completed, the containers 2 are carried out of the area of the blowing stations 3 by an extraction wheel 37 and conveyed to the delivery line 32 by the transfer wheel 28 and a delivery wheel 38.

Figure 4:
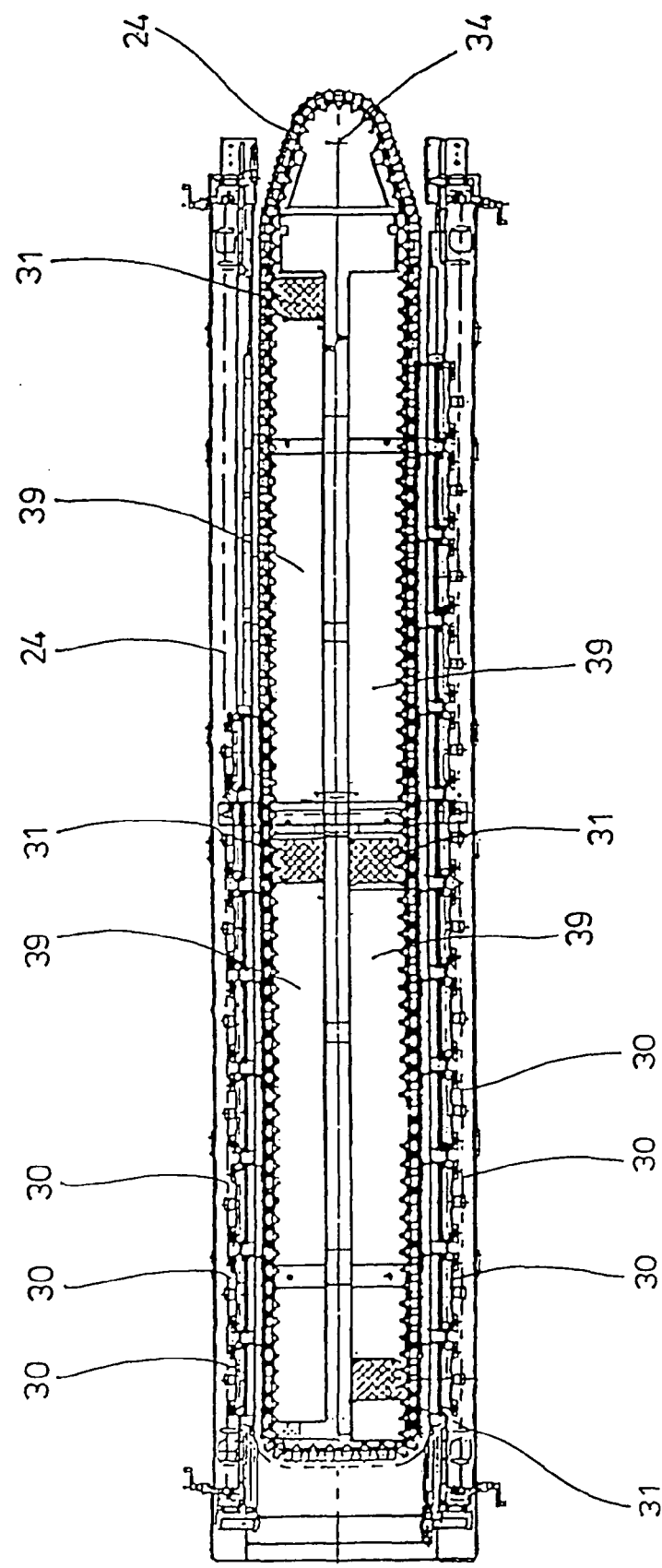
FIG. 4 shows a modified heating line with increased heating capacity.

In the modified heating line 24 illustrated in FIG. 4, a larger number of preforms 1 can be heated per unit time due to the larger number of radiant heaters 30. The fans 31 in this case feed cooling air into the area of cooling air ducts 39, which lie opposite the associated radiant heaters 30 and deliver the cooling air through discharge ports. A direction of flow of the cooling air essentially transverse to the direction of conveyance of the preforms 1 is realized by the arrangement of the discharge directions. In the area of surfaces opposite the radiant heaters 30, the cooling air ducts 39 can provide reflectors for the thermal radiation. It is also possible to realize cooling of the radiant heaters 30 by the delivered cooling air.

Figure 5:
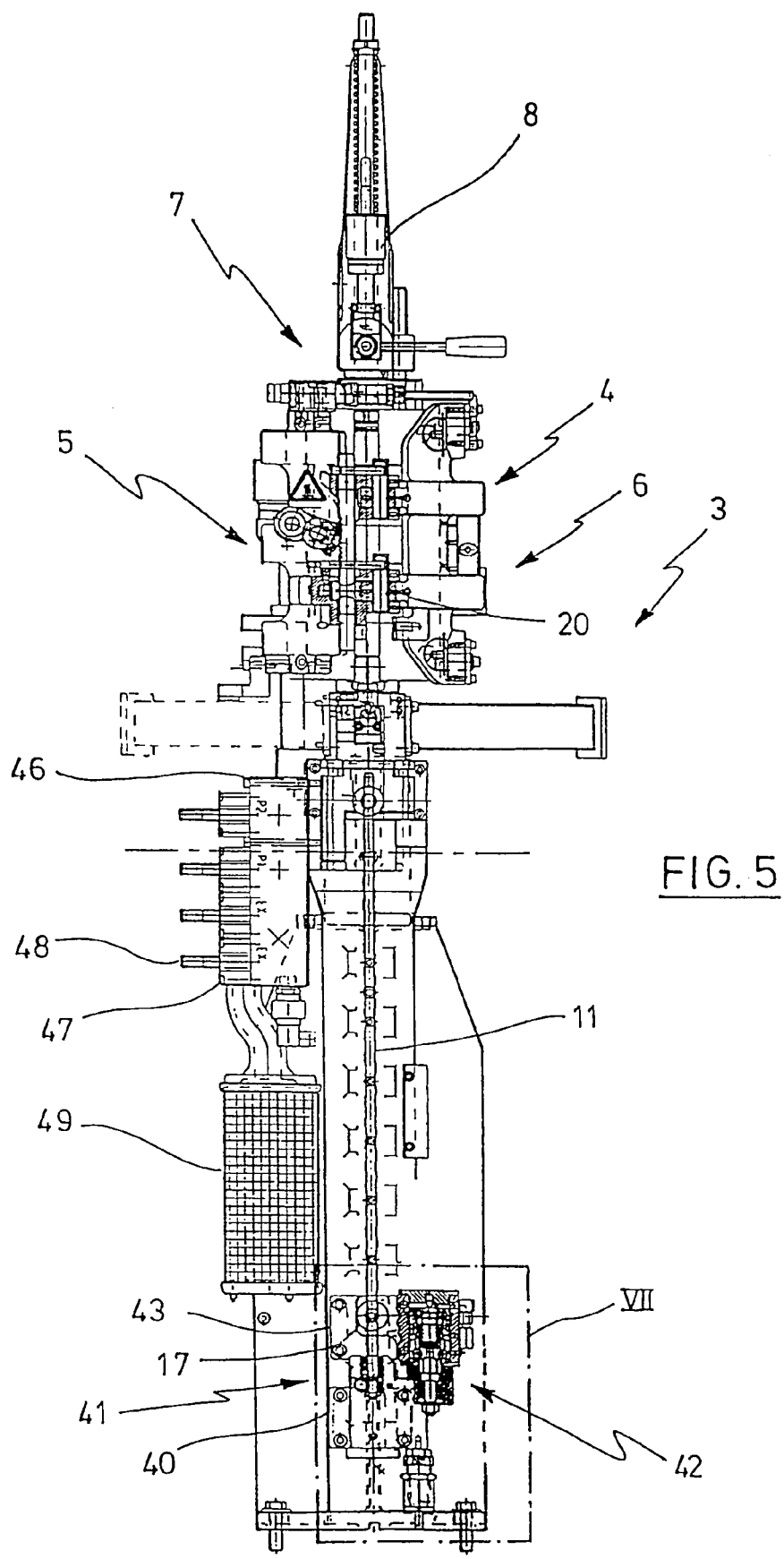
FIG. 5 shows a side view of a blowing station, in which a stretch rod is positioned by a stretch rod carrier.

FIG. 5 shows a view of the blowing station 3 that is modified relative to FIG. 1, with a direction of viewing from the front. In particular, this view shows that the stretch rod 11 is supported by a stretch rod carrier 41, which consists of a carrier base 40 and a roller carrier 43, which is connected with the carrier base 40 by a coupling element 42. The roller carrier 43 supports the guide roller 17, which serves to position the stretching system. The guide roller 17 moves along a curved track (not shown). Complete mechanical control of the stretching process is realized here.

The coupling element 42 illustrated in FIG. 5 can also be used in the embodiment of FIG. 1 to allow complete mechanical decoupling of the cylinders 12 from each other or from a supporting member for the guide roller 17.

FIG. 5 illustrates an engaged state of the coupling element 42, in which the carrier base 40 and the roller carrier 43 are connected with each other by the coupling element 42. This results in a rigid mechanical coupling, which causes positioning of the guide roller 17 to be directly and immediately converted to positioning of the stretch rod 11. As a result, precisely predetermined positioning of the stretch rod 11 is present in every state of motion of the blowing wheel 25, and with a large number of blowing stations 3 arranged on the blowing wheel 25, the positioning of the stretch rod 11 is precisely reproduced in each blowing station 3. This precise mechanical presetting of the positioning of the stretch rod 11 contributes to high product quality and high uniformity of the containers 2 that are produced.

FIG. 5 also shows the arrangement of a pneumatic block 46 for supplying blowing pressure to the blowing station 3. The pneumatic block 46 is equipped with high-pressure valves 47, which can be connected by connections 48 to one or more pressure supply sources. After the containers 2 have been blow molded, blowing air to be discharged to the environment is first fed to a muffler 49 via the pneumatic block 46.

Figure 6:
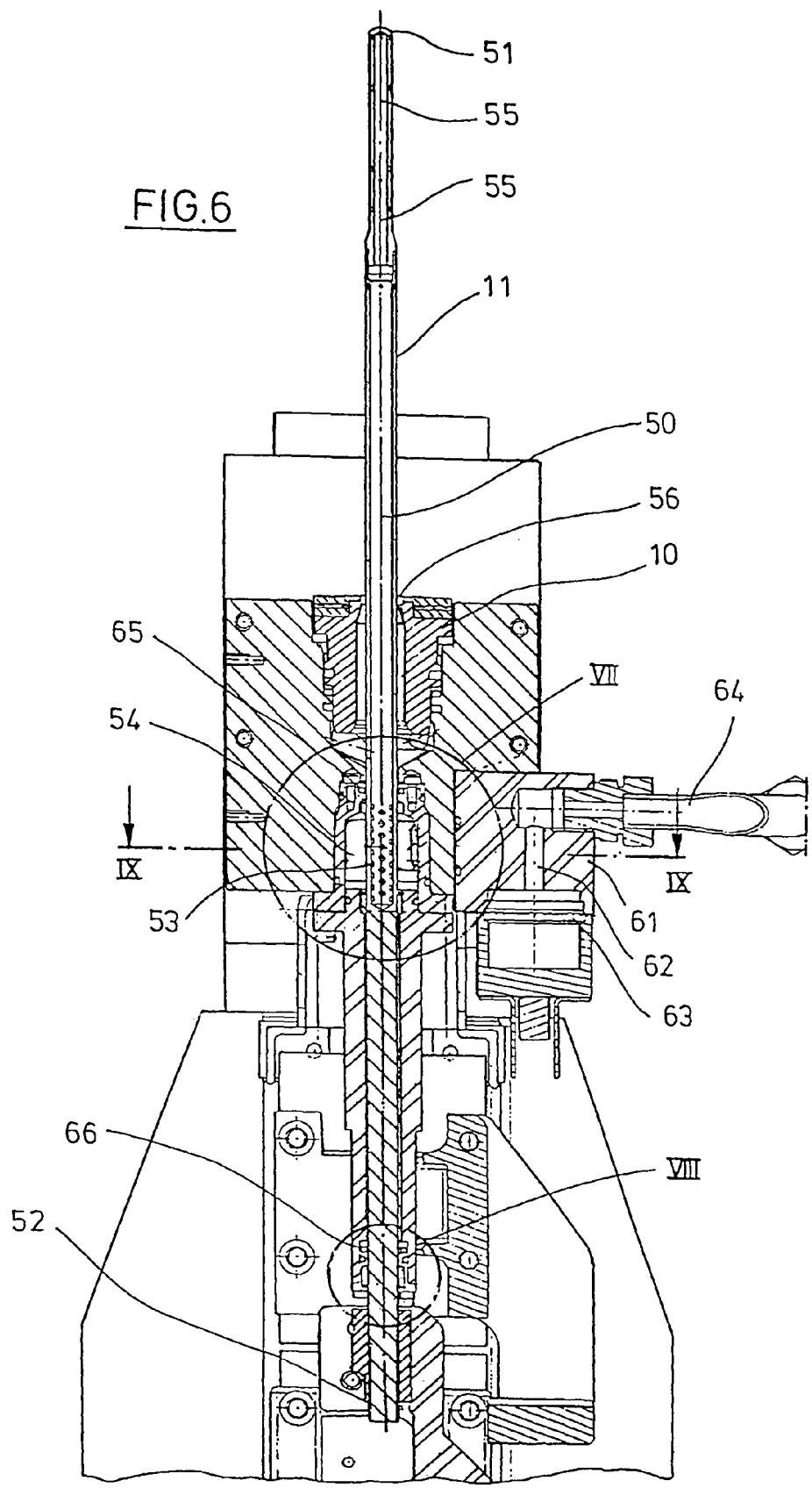
FIG. 6 shows an enlarged and partially cutaway view of an upper region of the stretch rod guide of the stretch rod.

FIG. 6 illustrates that the stretch rod 11 is provided with a rod interior 50, into which ports 53 open, which are positioned in between a stretch rod tip 51 and the opposite end 52 of the stretch rod 11 from the stretch rod tip 51. In the positioning of the stretch rod 10 illustrated in FIG. 6, the ports 53 constitute a connection between the rod interior 50 and a pressure chamber 54.

Discharge ports 55 are positioned in the region of the stretch rod 11 near the stretch rod tip 51. In the specific embodiment illustrated in FIG. 6, an annular gap 56 extends around the stretch rod 11 in the vicinity of the connecting piston 10, so that in this embodiment, pressurized gas can be supplied both through the rod interior 50 and through the annular gap 56.

An admission channel, which connects a control valve 63 with a gas supply line 64, is located in the area of a valve block 61. The gas supply to the pressure chamber 54 is controlled by the control valve 63.

Rod seals 65, 66 seal the stretch rod 11 from the environment. Inside the pressure space bounded by the rod seals 65, 66, sealed guidance of the region of the stretch rod 11 that is provided with the ports 53 is possible.

Figure 7:
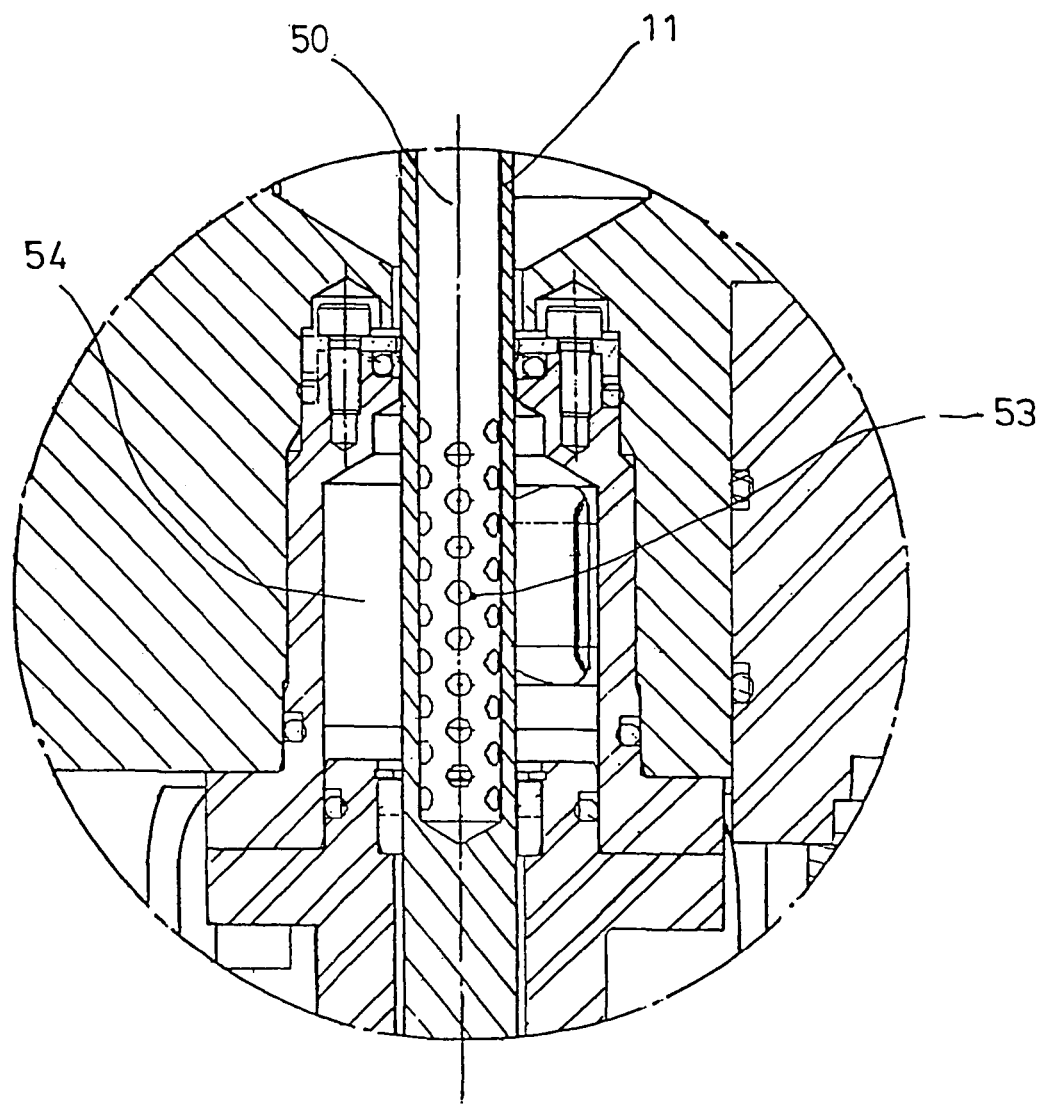
FIG. 7 shows an enlarged view of detail VII in FIG. 6.

FIG. 7 shows the structure of the stretch rod 11 in the region of the ports 53 and the design of the pressure chamber 54 in an enlarged view. In the illustrated embodiment, the ports 53 are arranged in rows in the direction of a longitudinal axis 57 of the stretch rod 11. Several rows of this type are spaced apart along the circumference of the stretch rod 11. In particular, it is proposed that the rows formed in this way in the direction of the longitudinal axis 57 be arranged with relative displacement from one another in such a way that the amount of the displacement is equal to half of the distance separating the ports 53 along the center line that passes through them. In this way, each port 53 of a row of ports 53 is located at the center of a rectangular reference surface formed by two ports 53 in each of the two rows of ports on either side of the given port 53. This arrangement is conducive to uniform flow.

Figure 8:
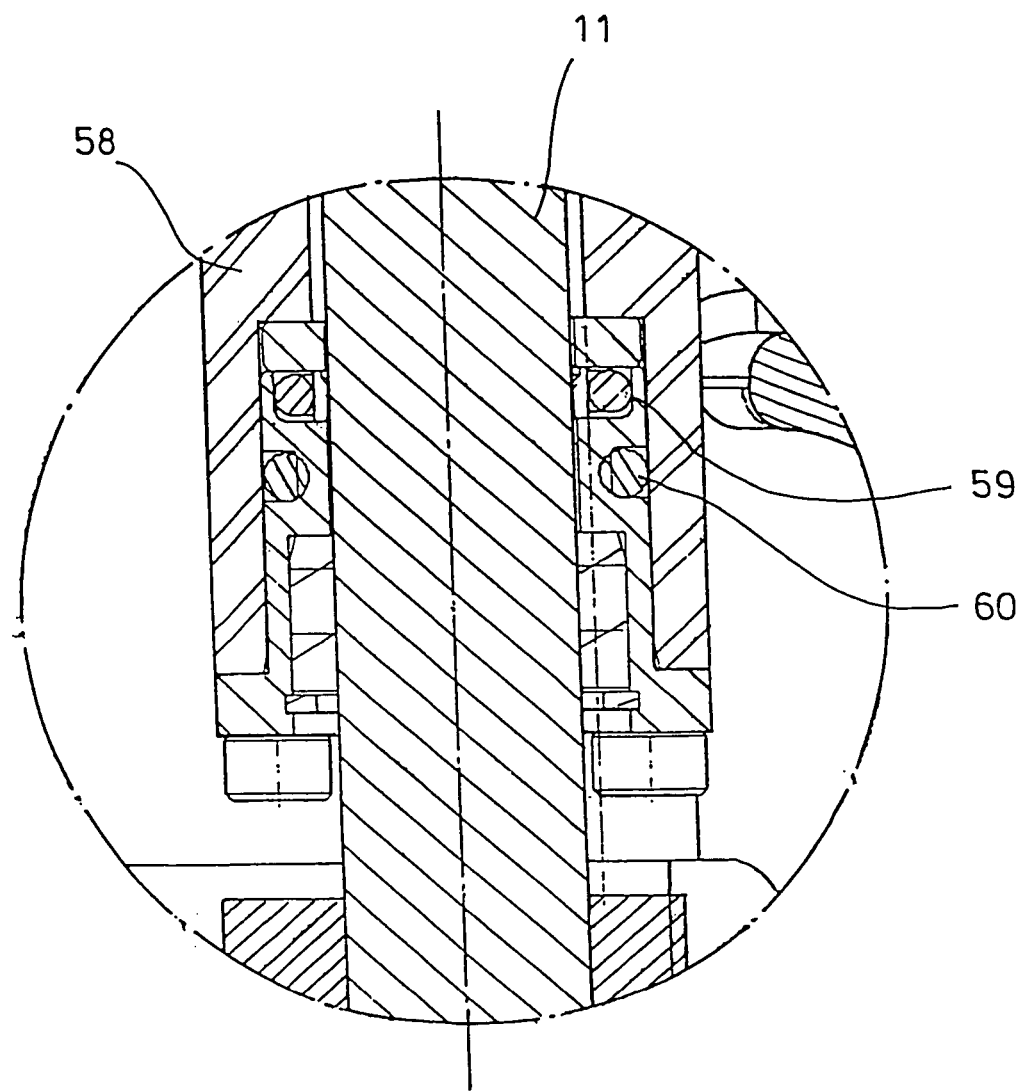
FIG. 8 shows an enlarged view of detail VIII in FIG. 6.

The enlarged view in FIG. 8 shows the sealed guidance of the stretch rod 11 in the region of a support 58. Seals 59, 60 are used for this purpose. The seal 59 can be designed as a rod seal, and the seal 60 can be designed as an O-ring. A rod seal consists of a hard ring, and an O-ring consists of soft metal.

FIG. 9 again illustrates the arrangement of the discharge ports 55 of the stretch rod 11 in a region of the stretch rod 11 near the stretch rod tip 51 and the arrangement of the annular gap 56 in the region of the mouth section 21 of the preform 1. This arrangement makes it possible, in particular, to introduce compressed air into the preform 1 or the developing container bubble 23 through the annular gap 56 at the beginning of the blow-molding operation and then to continue the introduction of the pressurized gas through the discharge ports 55 of the stretch rod 11. The discharge ports 55 are preferably arranged in a region of the stretch rod 11 close to the stretch rod tip 51, with the extent of this region in the direction of the longitudinal axis 57 being about 10 cm.

Figure 9:
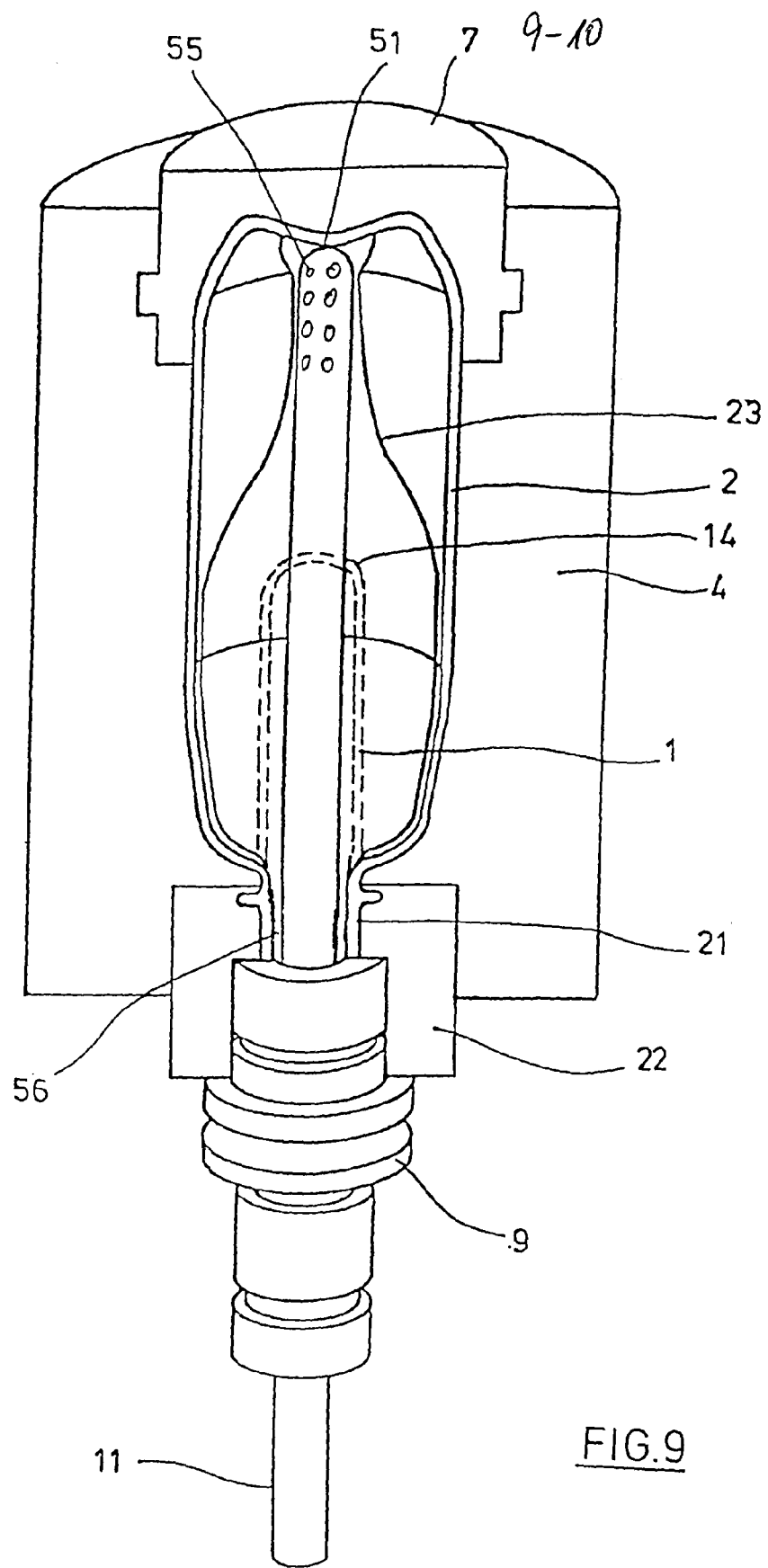
FIG. 9 shows a more detailed view, compared to FIG. 2, of a longitudinal section through the blowing station to illustrate two different flow paths for the pressurized gas.

FIG. 9 illustrates that, in a typical container bubble 23, the bubble already approaches or already rests against the blow mold 4 in the vicinity of the mouth section 21 in a relatively early state of formation. Depending on the geometry of the given container 2 that is to be blow molded, following the initial introduction of pressurized gas solely through the annular gap 56, the further introduction of pressurized gas can occur only through the discharge ports 55 of the stretch rod 11. However, it is also possible to supply the pressurized gas at least temporarily through both the annular gap 56 and the discharge ports 55.

Supplying pressurized gas simultaneously through the discharge ports 55 and the annular gap 56 makes it possible, due to the parallel connection of the flow paths, to supply pressurized gas with a lower flow resistance and thus in a smaller amount of time. Supplying pressurized gas in the second time phase of the blow-molding process solely through the discharge ports 55 promotes cooling in the area of the base of the container 2, which is formed significantly thicker than the sidewalls of the container for process-related reasons and therefore must be more intensely cooled to achieve sufficient material stability.

In principle, it is thus possible to supply the pressurized gas exclusively by the first flow path at first and then by the second flow path. However, it is also possible to supply the pressurized gas by both flow paths during the second phase of the blow-molding process or to provide an intermediate phase in which pressurized gas is first supplied simultaneously by both flow paths, and then a shaping phase in which pressurized gas is supplied exclusively by the second flow path.

In accordance with a preferred variant of the method, pressurized gas at a relatively low pressure level, for example, at a pressure of 5-20 bars, is supplied by the first flow path, while pressurized gas at a relatively high pressure level, for example, at a pressure of about 40 bars, is supplied by the second flow path. The lower pressure can be derived from the higher pressure by a pressure converter. In principle, it is also possible to design the cross-sectional shape of the first flow path in such a way that the first flow path is also connected to the higher pressure, and the flow resistance that is provided produces the intended pressure reduction.

As an alternative to the arrangement of the first flow path as an annular gap 56 surrounding the stretch rod 11, as shown in FIG. 9, it is also possible to provide the stretch rod 11 with a larger diameter and to arrange the separate flow paths inside the stretch rod 11. To this end, with the positioning above the mouth section 21 that is illustrated in FIG. 9, it would be advantageous to provide the stretch rod with discharge ports that open in the first flow path. However, the embodiment illustrated in FIG. 9 has the advantage that only a relatively small fraction of the cross-sectional area of the mouth section 21 is filled by the wall material of the stretch rod 11, and as a result the comparatively large remainder of the cross-sectional area is available for the two flow paths.

Alternatively or additionally to supplying pressurized gas at different pressure levels by the two flow paths, it is also possible to supply pressurized gas at different temperatures. In particular, it is proposed that pressurized gas be supplied at a higher temperature during a first process phase than during a second process phase.

A cooling effect during the second process phase can be promoted by a suitable configuration of the flow paths and the discharge ports 55. It has been found to be especially advantageous to select the geometric configuration of the flow paths in such a way that the highest possible pressure level is maintained in the rod interior 50 during the flow of the pressurized gas through the stretch rod, and that a large pressure gradient develops along the discharge ports 55. This results in expansion of the gas into the container locally close to the base of the container 2, so that the cooling of the gas on expansion can be utilized in addition to the cooling of the container base.

Before the pressurized gas is discharged from the interior of the container 2, it is possible first to withdraw the stretch rod 11 completely from the interior of the blow mold 4 and thus to make the entire cross-sectional area of the mouth section 21 available for the gas being discharged. This promotes a rapid pressure drop, which results in cooling of the gas present inside the container 2 and thus in additional cooling of the wall material of the container 2.

Alternatively, however, it is also possible to leave the stretch rod in the position shown in FIG. 9 or in a slightly lowered position at least during part of the time interval necessary for the removal of the pressurized gas and to convey at least a portion of the pressurized gas back into the interior of the stretch rod 11 through the discharge ports 55. This produces a gas flow inside the container 2 during the removal of the pressurized gas. This gas flow is in the direction of the base of the container 2, so that an additional cooling effect is achieved. The optimum variant of the method is again selected on the basis of the specific geometry of the container 2.

Figure 10:
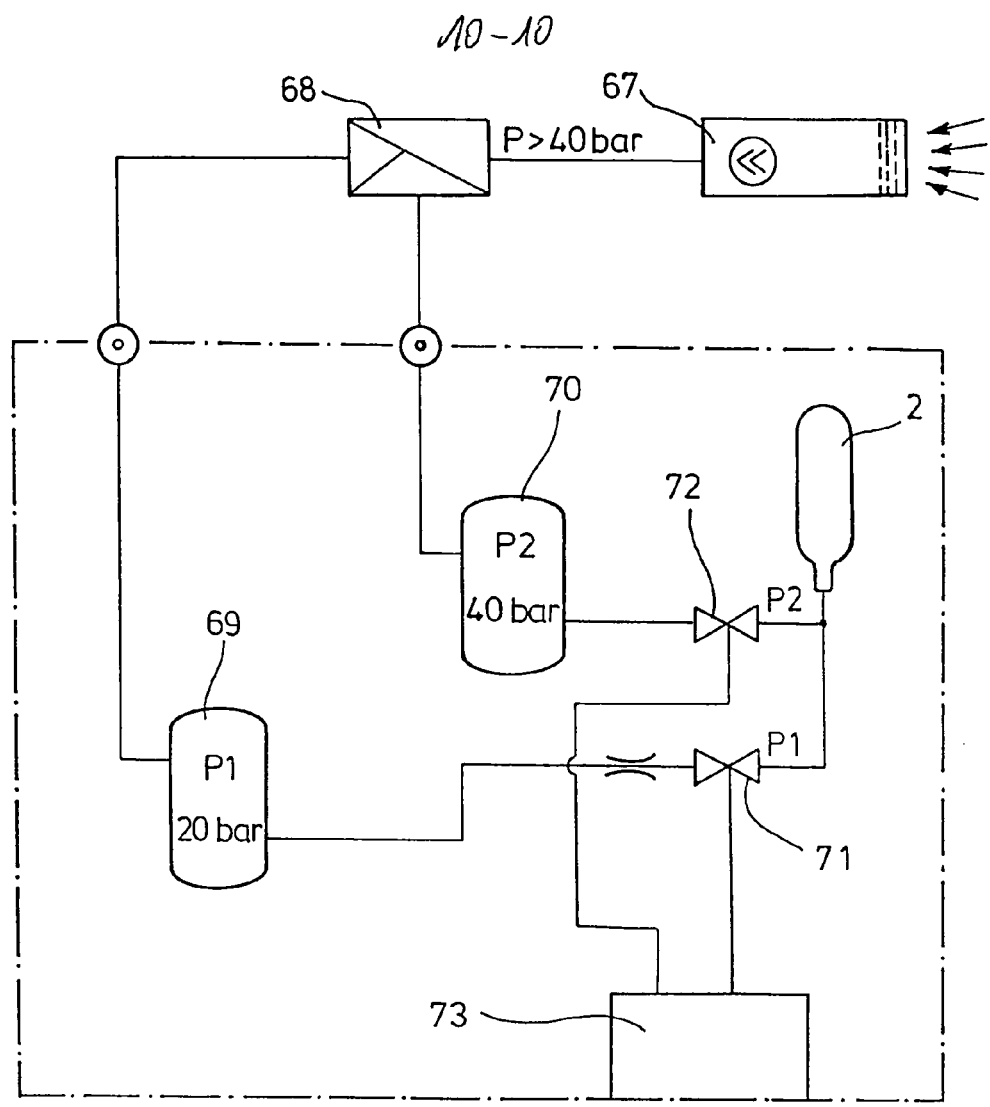
FIG. 10 shows a functional block diagram that illustrates the compressed air supply to the blowing station.

FIG. 10 shows a schematic block diagram of the compressed air supply. The container 2 that is drawn in the diagram simultaneously represents the preform 1 and the container bubble 23. Pressure at a delivery pressure level, for example, above 40 bars, is produced by a compressor 67. In the illustrated embodiment, a pressure reduction to two different supply pressure levels is effected by one or more pressure converters. The higher pressure level here is about 40 bars, and the lower pressure level is about 20 bars.

Reservoir volumes for each pressure are made available by tanks 69, 70, so that even in the case of timed delivery of pressurized gas, the given pressure level is at least approximately maintained. Valves 71, 72 are used for the controlled supply of pressurized gas. The valves 71, 72 are connected to a control unit 73, which coordinates the given switching times of the valves 71, 72.

In accordance with the present invention, it is proposed especially that the second flow path, which runs through the stretch rod 11, opens into the interior of the container exclusively in a region of the end 52 of the stretch rod. Accordingly, there are no discharge ports along the longitudinal extent of the stretch rod 11 between the opening of the stretch rod 11 into the interior of the container 2 and the area of the end 52 of the stretch rod. The discharge port or discharge ports of the second flow path are typically located in a region of the end 52 of the stretch rod with a maximum distance from the stretch rod tip 51 of about 2.5 cm. It is especially preferred for the discharge port or discharge ports to be located at a maximum distance from the stretch rod tip 51 of 1.0 cm.

The above discussion with respect to the conveyance of the blowing air by the second flow path towards the base of the container 2 refers to flow conveyance for at least most of the blowing air. Naturally, this does not rule out the possibility that small amounts could enter the interior of the container 2 by leakage, small-sized secondary openings, or other secondary flow paths. However, it is advantageous to ensure flow conveyance for the largest possible fraction of the blowing air towards the base of the container 2.

To help optimize the blowing process, the volume fractions of the blowing gas that are supplied to the interior of the container 2 by the first and second flow paths are coordinated according to the particular application. Due to the higher pressure at the end of the blowing process, it is generally advantageous to supply a greater volume fraction relative to the filling volume of the container 2 via the second flow path at a maximum pressurization.

The time at which the flow conveyance by the first flow path and the second flow path is switched is also optimized. In this regard, it is generally found to be advantageous to activate the second flow path for a longer period of time than the first flow path.

The invention claimed is:

1. Method for blow molding containers, in which a preform is stretched inside a blow mold by a stretch rod after thermal conditioning and is reshaped into the container by the action of blowing pressure, and in which pressurized gas for the blow molding is fed into the container through the stretch rod, wherein the pressurized gas is simultaneously conveyable into the container (2) by a flow path that runs through the stretch rod (11) and a flow path that runs past the stretch rod (11) on the outside, wherein the pressurized gas initially reshapes the preform into a container bubble, and subsequently reshapes the bubble into the container, wherein the pressurized gas is fed through the stretch rod along both flow paths before a final shaping of the container.

2. Method in accordance with claim 1, wherein the pressurized gas is supplied at least temporarily by only one of the flow paths.

3. Method in accordance with claim 1, wherein the pressurized gas is conveyed into the preform (1) in the vicinity of the mouth section (21) in a first phase of the process.

4. Method in accordance with claim 3, wherein the pressurized gas is introduced by a flow path surrounding the stretch rod (11) during the first phase of the process.

5. Method in accordance with claim 3, wherein the pressurized gas is introduced through the stretch rod (11) in a second phase of the process.

6. Method in accordance with claim 5, wherein the pressurized gas is introduced in the vicinity of a base of the container (2) during the second phase of the process.

7. Method in accordance with claim 5, wherein the pressurized gas is introduced at a higher pressure during the second phase of the process than during the first phase of the process.

8. Method in accordance with claim 3, wherein the pressure is relieved after the stretch rod (11) has first been retracted.

9. Method in accordance with claim 1, wherein the pressure is relieved at least partially through the stretch rod (11).

10. Device for blow molding containers, which has at least one blowing station with at least one blow mold and at least one stretch rod, and in which the stretch rod is connected to a supply system for supplying pressurized gas for blow molding a preform to form a container, wherein the blowing station (3) has at least two different flow paths for the pressurized gas that lead into the space enclosed by the blow mold (4), wherein one flow path runs through the stretch rod (11) and one flow path runs past the stretch rod (11) on the outside, the blowing station being configured to permit simultaneous flow of the pressurized gas through both flow paths, whereby the pressurized gas first reshapes the preform to form a container bubble and subsequently reshapes the bubble to form the container, wherein the pressurized gas is conducted through the stretch rod along both flow paths before a final shaping of the container.

11. Device in accordance with claim 10, wherein at least two flow paths flow through the stretch rod (11).

12. Device in accordance with claim 10, wherein a flow path opens into the blow mold (4) in the vicinity of an access opening of the blow mold (4).

13. Device in accordance with claim 10, wherein one flow path opens at least temporarily into an interior space enclosed by the blow mold (4) in the vicinity of a base section (7) of the blow mold (4).

14. Device in accordance with claim 10, wherein the first flow path is designed for feeding the pressurized gas for molding the container.

15. Device in accordance with claim 10, wherein the second flow path is designed for feeding the pressurized gas for molding the container.

16. Device in accordance with claim 10, wherein at least two flow paths are designed for feeding the pressurized gas with different pressure levels.

17. Device in accordance with claim 10, wherein the stretch rod (11) has an interior that is enclosed by sidewalls, and that the interior is connected to a pressurized gas supply by a plurality of recesses in the wall.

18. Device in accordance with claim 10, wherein at least one adjusting element for realizing a valve function is arranged in the area of each flow path.

\* \* \* \* \*

UNITED STATES PATENT AND TRADEMARK OFFICE
CERTIFICATE OF CORRECTION

PATENT NO. : 8,574,486 B2  Page 1 of 1
APPLICATION NO. : 10/570796
DATED : November 5, 2013
INVENTOR(S) : Jaksztat et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1616 days.

Signed and Sealed this
Twenty-second Day of September, 2015

Michelle K. Lee
*Director of the United States Patent and Trademark Office*